US008693579B2

(12) United States Patent
Abdelgany et al.

(10) Patent No.: US 8,693,579 B2
(45) Date of Patent: Apr. 8, 2014

(54) SWITCHABLE DVB-H RECEIVER

(75) Inventors: Mohy Abdelgany, Irvine, CA (US); Jun Ma, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 1530 days.

(21) Appl. No.: 11/869,801

(22) Filed: Oct. 10, 2007

(65) Prior Publication Data

US 2009/0097599 A1    Apr. 16, 2009

(51) Int. Cl.
*H04W 4/00* (2009.01)
*H04L 1/02* (2006.01)
*H04B 1/10* (2006.01)

(52) U.S. Cl.
USPC ........... 375/316; 375/347; 375/349; 370/332; 370/328; 370/464

(58) Field of Classification Search
USPC ......... 375/316, 358, 260, 267, 219, 211, 220, 375/222, 295, 325, 346, 347, 349, 354; 370/276, 278, 282, 310, 360, 437, 449, 370/465, 480, 481, 277, 279, 293, 329, 332, 370/333, 334, 339, 431, 464, 492; 455/435.2, 450, 464, 9, 500, 509, 515, 455/68, 69, 71, 132, 133, 136, 139, 150.1, 455/161.5, 164.1, 3.01, 405, 15, 16, 19, 73, 455/83, 84, 91, 101, 103, 130

See application file for complete search history.

(56) References Cited

U.S. PATENT DOCUMENTS

| 2006/0245525 | A1* | 11/2006 | Cho | 375/340 |
| 2007/0155314 | A1* | 7/2007 | Mohebbi | 455/11.1 |
| 2007/0184802 | A1* | 8/2007 | Carvalho et al. | 455/277.1 |
| 2009/0021641 | A1* | 1/2009 | Matsuura et al. | 348/553 |
| 2009/0060011 | A1* | 3/2009 | Hanke et al. | 375/219 |

FOREIGN PATENT DOCUMENTS

EP    1764925 A1 *  3/2007

* cited by examiner

*Primary Examiner* — Sam K Ahn
*Assistant Examiner* — Linda Wong
(74) *Attorney, Agent, or Firm* — Rahman LLC

(57) ABSTRACT

One embodiment provides a method of providing low power operations in a switchable Digital Video Broadcasting—Handheld (DVB-H) receiver operable as a single receiver and as a diversity receiver includes operating the switchable DVB-H receiver in a single receiver mode in a first coverage region, the first coverage region corresponding to conditions in which both the single receiver as well as the diversity receiver satisfy a predetermined performance criteria, and switching the switchable DVB-H receiver to a diversity receiver mode in a second coverage region, the second coverage region corresponding to conditions in which the diversity receiver satisfies the predetermined performance criteria and the single receiver does not satisfy the predetermined performance criteria.

15 Claims, 7 Drawing Sheets

SWITCHABLE DVB-H RECEIVER

BACKGROUND

1. Technical Field

The embodiments herein generally relate to Digital Video Broadcasting, and, more particularly, to Digital Video Broadcasting—Handheld (DVB-H) receivers with low power consumption.

2. Description of the Related Art

In order to implement a service level in a network for a customer, service requirements are typically expressed in measurable quality of service (QoS) metrics. For wireless networks, jitter, bandwidth, noise, and fading are some of the deciding QoS metrics. For example, frame error rate (FER) is a link-layer metric while fading and the resulting bit error rate (BER) are Physical layer metrics (PHY metrics). PHY metrics may include power, distance, signal-to-noise ratio (SNR), signal-to-noise-and-interference ratio (SNIR), BER, and/or packet error rate (PER). BER is the number of erroneous bits received divided by the total number of bits transmitted. PER is the number of video packets in error compared to the total number of video packets.

Coverage maps are designed to indicate the service areas of radio communication transmitting stations. Typically a coverage map will indicate the area within which the user can expect to obtain good reception of the service in question using standard equipment under normal operating conditions. Additionally, the map may also separately denote supplementary service areas where good reception may be obtained but other stations may be stronger, or where reception may be variable but the service may still be usable. Antenna diversity is a transmission technique in which the information-carrying signal is transmitted along different propagation paths. This can be achieved by using multiple receiver antennas (e.g., diversity reception) and/or by using multiple transmitting antennas (e.g., transmit diversity). A diversity combining circuit combines or selects the signals from the receiver antennas to constitute an improved quality signal.

One method of diversity combining is maximal-ratio combining (MRC), in which the signals from each channel are added together, the gain of each channel is made proportional to the root mean square (RMS) signal level and inversely proportional to the mean square noise level in that channel, and different proportionality constants are used for each channel. DVB-H is a technical specification for bringing broadcast services to handheld receivers, terrestrial television (TV), portable TVs, mobile phones and other such mobile terminals. In DVB-H device systems, diversity receivers are used to improve the carrier-to-noise (C/N) performance and to provide diversity gain (e.g., by about 3 to 9 dB) in static to slow varying channel conditions and/or Doppler frequency (e.g., by twice) in mobile channel condition. In addition, they suppress part of the ingress noise and short echoes problems, thus offering significant reception performance improvement with portable and mobile reception in places where a single receiver would not function.

FIG. 1 illustrates a typical DVB-H diversity receiver 100 having two identical single receivers 102 and 104, with corresponding antennas 106 and 108. The single receivers 102 and 104 each include tuners 110 and 112, and baseband digital receivers 114 and 116, as shown in FIG. 1. A combining block may maximize the SNR after the combination. The power consumption of the diversity receiver 100 with two antennas 106 and 108 will thus be approximately twice the power consumption of the corresponding single receiver. In power hungry applications like DVB-H, low power consumption is critical to the success of diversity receivers in the mobile TV market. Further, if the channel condition in one of the channels in the diversity receiver is poor, it may actually result in degraded performance after MRC combining as compared to the performance of the single receiver. Accordingly, there remains a need for a scheme for low-power consumption operation of DVB-H receivers without performance degradations.

SUMMARY

In view of the foregoing, an embodiment herein provides a switchable Digital Video Broadcasting—Handheld (DVB-H) receiver operable as a single receiver and as a diversity receiver includes a processor adapted to operate in a single receiver mode in a first coverage region, the first coverage region corresponding to conditions in which both the single receiver as well as the diversity receiver satisfy a predetermined performance criteria, and a switching mechanism adapted to switch operations of the processor from the single receiver mode to a diversity receiver mode in a second coverage region, the second coverage region corresponding to conditions in which the diversity receiver satisfies the predetermined performance criteria and the single receiver does not satisfy the predetermined performance criteria.

The processor may be adapted in a third coverage region to operate in the single receiver mode, the third coverage region corresponding to conditions in which neither the single receiver nor the diversity receiver satisfy the predetermined performance criteria. The predetermined performance criteria may be based on Physical Layer (PHY) metrics. The PHY metrics may include a Signal-to-Noise Ratio (SNR), a Bit Error Rate (BER), and a Packet Error Rate (PER). The predetermined performance criteria may include the BER being less than a threshold value. The switchable DVB-H receiver may be operated in the single receiver mode in the third coverage region, based on a channel condition in at least one channel of the diversity receiver. The channels of the diversity receiver may be combined using Maximal Ratio Combining (MRC).

In another aspect, a method of providing low power operations in a switchable Digital Video Broadcasting—Handheld (DVB-H) receiver operable as a single receiver and as a diversity receiver includes operating the switchable DVB-H receiver in a single receiver mode in a first coverage region, the first coverage region corresponding to conditions in which both the single receiver as well as the diversity receiver satisfy a predetermined performance criteria, and switching the switchable DVB-H receiver to a diversity receiver mode in a second coverage region, the second coverage region corresponding to conditions in which the diversity receiver satisfies the predetermined performance criteria and the single receiver does not satisfy the predetermined performance criteria.

The switchable DVB-H receiver may be operated in a third coverage region in the single receiver mode, the third coverage region corresponding to conditions in which neither the single receiver nor the diversity receiver satisfy the predetermined performance criteria. The predetermined performance criteria may be based on Physical Layer (PHY) metrics. The PHY metrics may include a Signal-to-Noise Ratio (SNR), a Bit Error Rate (BER), and a Packet Error Rate (PER). The predetermined performance criteria may include the BER being less than a threshold value. The switchable DVB-H receiver may be operated in the third coverage region in the single receiver mode, based on a channel condition in at least one channel of the diversity receiver. The channels of the diversity receiver may be combined using Maximal Ratio Combining (MRC).

In yet another aspect, a mobile terminal includes a digital video broadcasting—handheld (DVB-H) receiver for receiving a digital video broadcast signal operable as a single receiver and as a diversity receiver, a memory component for storing the received digital video broadcast signal, and a processor configured to operate the DVB-H receiver in a single receiver mode in a first coverage region, the first coverage region corresponding to conditions in which both the single receiver as well as the diversity receiver satisfy a predetermined performance criteria. The DVB-H receiver may be switched to a diversity receiver mode in a second coverage region, the second coverage region corresponding to conditions in which the diversity receiver satisfies the predetermined performance criteria and the single receiver does not satisfy the performance criteria, and the DVB-H receiver may be operated in the single receiver mode in a third coverage region, the third coverage region corresponding to conditions in which neither the single receiver nor the diversity receiver satisfy the predetermined performance criteria.

The switchable DVB-H receiver may be operated in the single receiver mode in the third coverage region, based on a channel condition in at least one channel of the diversity receiver. The channels of the diversity receiver may be combined using Maximal Ratio Combining (MRC). The predetermined performance criteria may be based on Physical Layer (PHY) metrics. The PHY metrics may include a Signal-to-Noise Ratio (SNR), a Bit Error Rate (BER) and a Packet Error Rate (PER). The predetermined performance criteria may include the BER being less than a threshold value ($1 \times 10^{-4}$).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
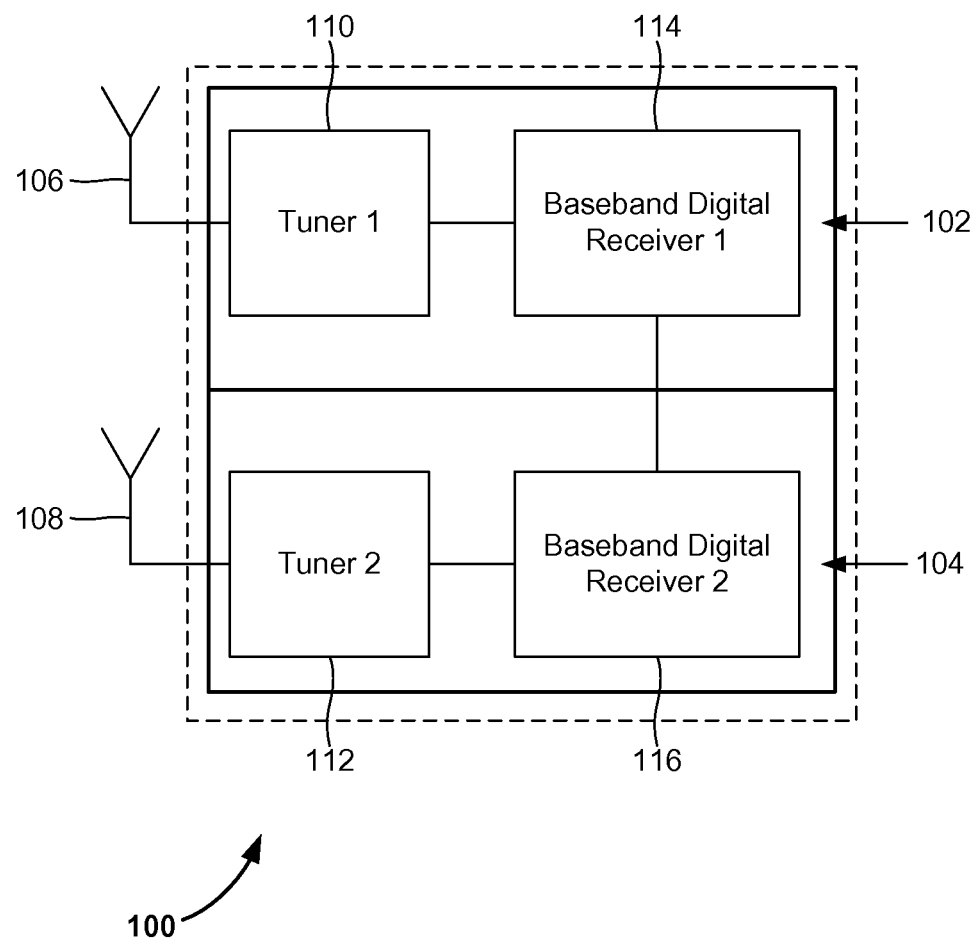
FIG. 1 illustrates a typical DVB-H diversity receiver having two identical single receivers with corresponding antennas.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a scheme for low-power consumption operation of DVB-H receivers without performance degradations. The embodiments herein achieve this by providing a method of providing low power operations in a switchable receiver operable as a single receiver and as a diversity receiver, the method including operating the switchable receiver in a single receiver mode in a first coverage region, the first coverage region corresponding to conditions in which both the single receiver as well as the diversity receiver satisfy a performance criteria, and switching the switchable receiver to a diversity receiver mode in a second coverage region, the second coverage region corresponding to conditions in which the diversity receiver satisfies the performance criteria and the single receiver does not satisfy the performance criteria. Referring now to the drawings, and more particularly to FIGS. 1 through 7, where similar reference characters denote corresponding features consistently throughout the figures, there are shown preferred embodiments.

Figure 2:
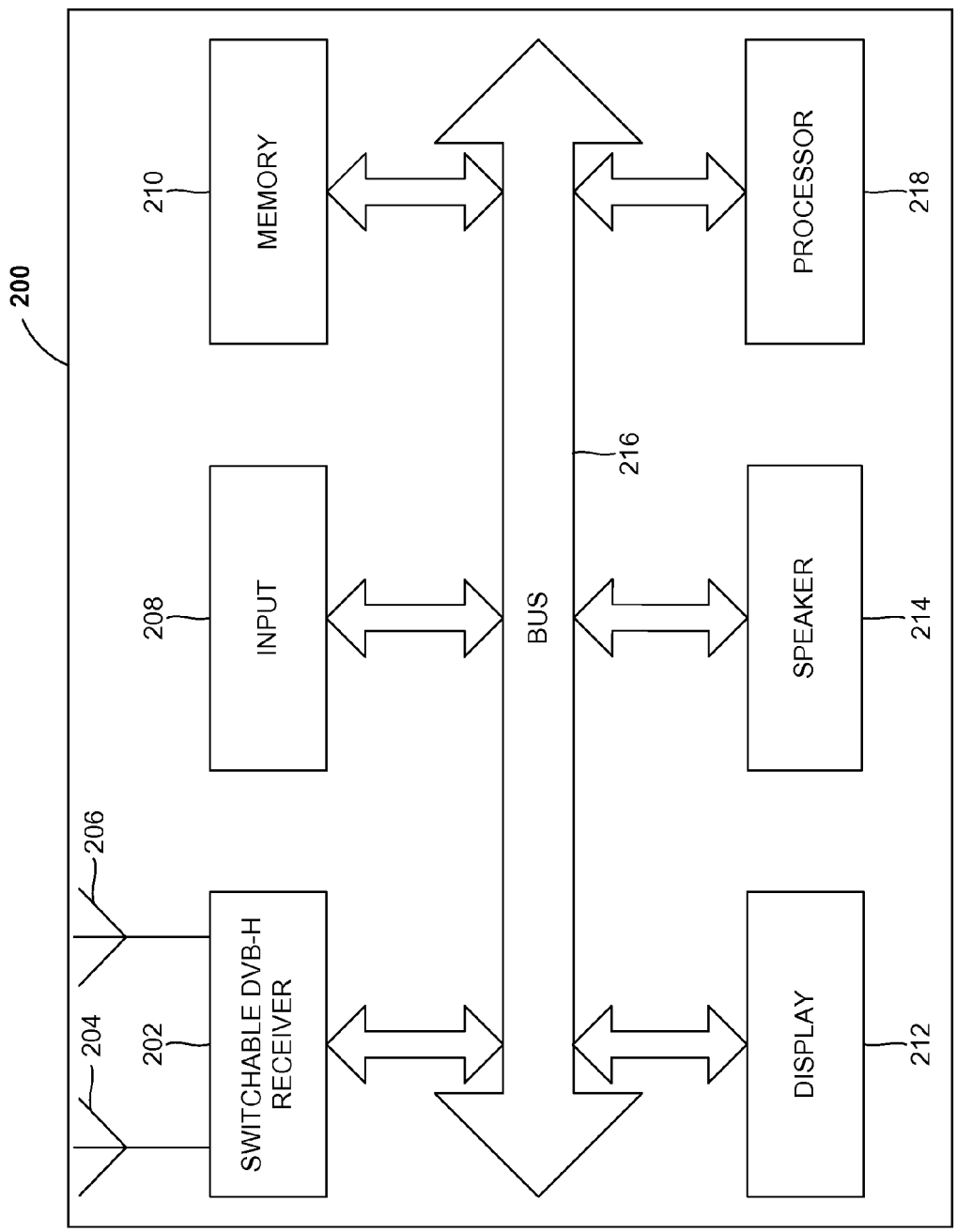
FIG. 2 illustrates a mobile terminal according to an embodiment herein.

FIG. 2 illustrates a mobile terminal 200 having a switchable receiver 202 having two antennas 204 and 206, an input 208, a memory 210 having a computer set of instructions, a display 212, a speaker 214, a bus 216, and a processor 218 capable of processing the set of instructions to perform any one or more of the methodologies described below, according to an embodiment herein. Radio signals transmitted by a network (e.g., a broadcast network) are received via the antennas 204, 206 and are passed to the switchable receiver 202 as illustrated in FIG. 2. The switchable receiver 202 may include a single receiver, a diversity receiver, a combining block module, a PHY metrics module, and a switching module. The combining block module may include an MRC module.

The switching module may switch operations (e.g., a switch decision is made through an algorithm which is usually application dependent and implemented in software) of the switchable receiver 202 between a single receiver mode and a diversity receiver mode, based on a performance criteria determined by the PHY metrics module. The relevant PHY metrics may be collected and monitored continuously by the software in the host processor 218. The host processor 218 then instructs the switchable DVB-H receiver to perform the switch action by configuring the receiver registers through certain interfaces (e.g. I2C interface). The Inter-Integrated Circuit (I2C) is a multi-master serial bus used to attach low speed peripherals to a motherboard, embedded system, cell phone, etc. in industrial and consumer electronics devices for providing communication links between multiple integrated circuits in a system. The PHY metrics module may include an SNR module, a BER module and a PER module. The switchable receiver 202 may decode digital content from the received signals. Digital content may additionally or alternatively be decoded by the processor 218. The processor 218 may also enable digital content to be consumed in the form of video for output via one or more displays 212 or audio for output via speaker and/or earphones 214. Processor 218 may also carry out the methods described herein according to the embodiments herein. Digital content may also be stored in the memory 210 for future processing or consumption.

Memory 210 may also store program specific information and/or service information (PSI/SI), including information about digital content available in the future or stored from the past. A user of mobile terminal 200 may view this stored service information on display 212, and select an item of digital content for viewing, listening, or other uses via input 804, which may take the form of a keyboard, keypad, scroll wheel, or other input device(s) or combinations thereof. When digital content is selected, processor 218 may pass information to receiver 202, so that the receiver may act appropriately (e.g., tune a radio or filter signals based on PSI/SI in order to yield specific digital content for the user). Service information may be encoded within the same digital bursts which deliver other forms of digital content to the mobile terminal 200. Digital content and PSI/SI may be passed among functions within mobile terminal 202 using bus 216.

Figure 3:
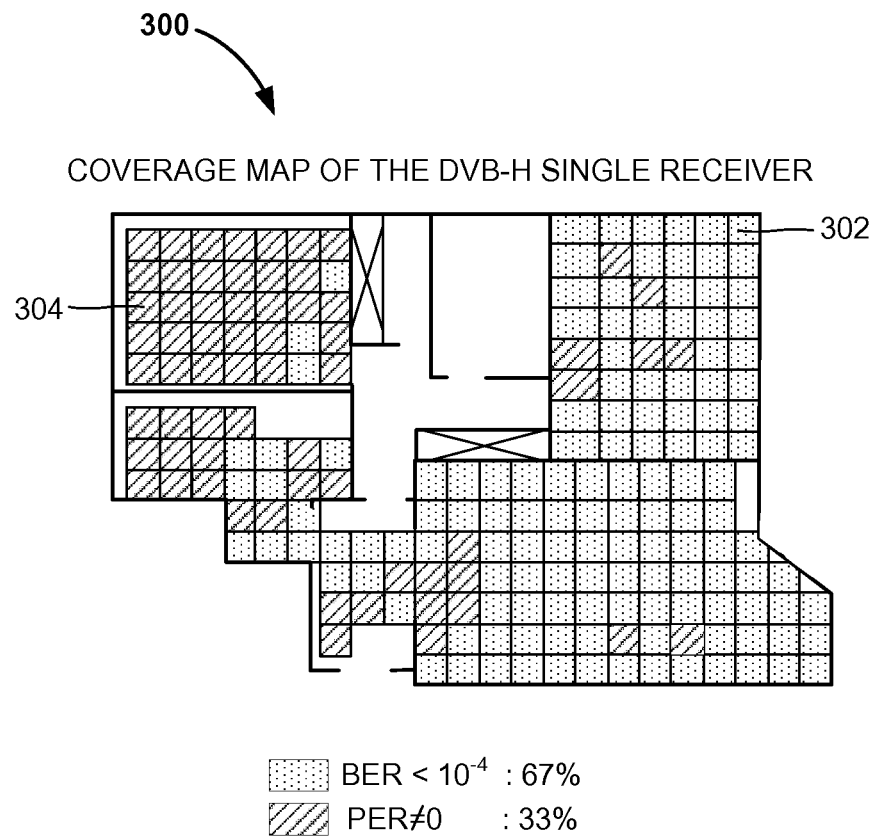
FIG. 3 illustrates a coverage map of a certain area a single DVB-H receiver showing a region in which a bit error rate is less than $1 \times 10^{-4}$ and a region in which a packet error rate is not equal to zero according to an embodiment herein.

FIG. 3 illustrates a coverage map 300 of a certain area of a single DVB-H receiver (e.g., the single receiver 102 of FIG. 1) showing a region 302 in which a bit error rate is less than $1 \times 10^{-4}$ and a region 304 in which a packet error rate is not equal to zero according to an embodiment herein. A similar coverage map may be obtained when the switchable DVB-H receiver 202 is operated in a single receiver mode. The region 302 constitutes 67% and the region 304 constitutes 33% of the coverage map 300.

Figure 4:
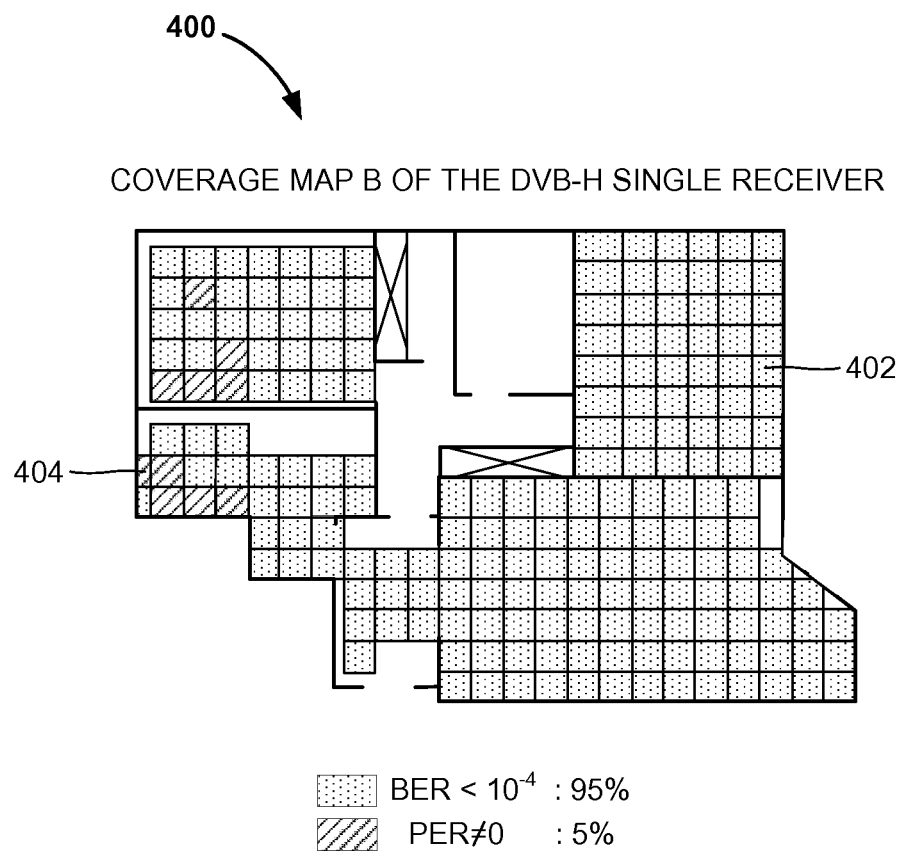
FIG. 4 illustrates a coverage map of the same area of FIG. 3 of a diversity DVB-H receiver showing a region in which the bit error rate is less than $1 \times 10^{-4}$ and a region in which a packet error rate is not equal to zero according to an embodiment herein.

FIG. 4 illustrates a coverage map 400 of the same area of FIG. 3 of a diversity DVB-H receiver (e.g., the diversity receiver 100 of FIG. 1) showing a region 402 in which the bit error rate is less than $1 \times 10^{-4}$ and a region 404 in which a packet error rate is not equal to zero according to an embodiment herein. A similar coverage map may be obtained when the switchable DVB-H receiver 202 is operated in a diversity receiver mode). The region 402 may cover 95% and the region 404 may cover only 5% of the coverage map 400. The area occupied by the region 302 in FIG. 3 is a subset of the area occupied by the region 402.

Figure 5:
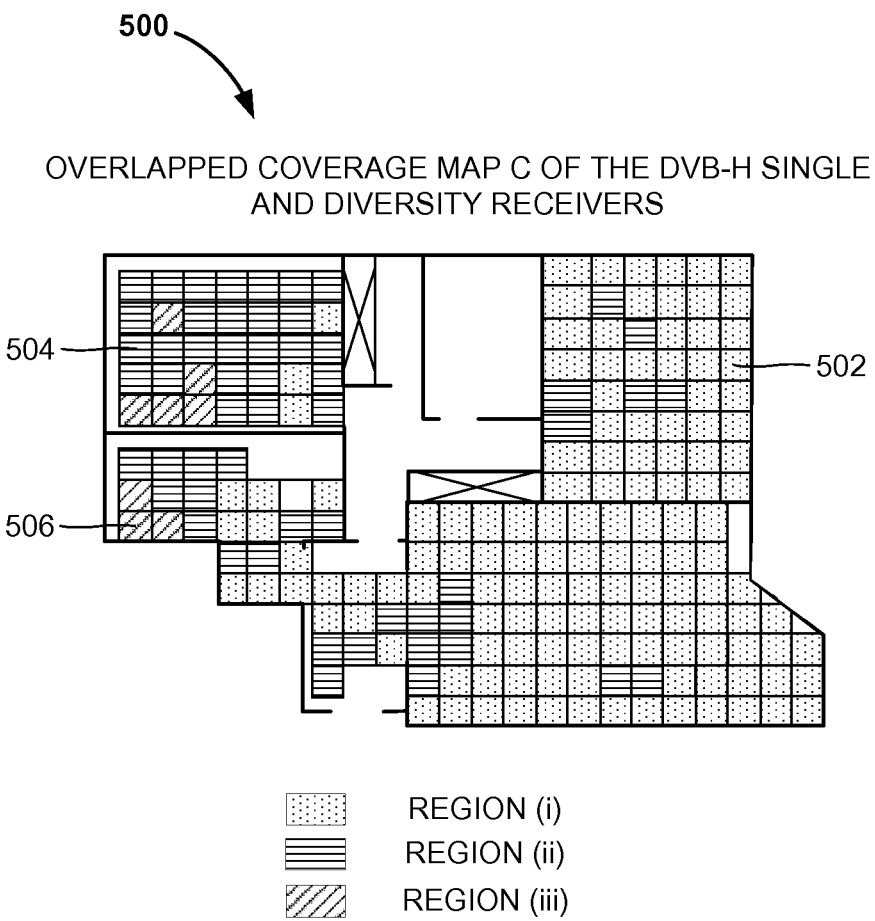
FIG. 5 illustrates an overlapped coverage map of the coverage map of FIG. 3 and the coverage map of FIG. 4, showing a first coverage region, a second coverage region, and a third coverage region according to an embodiment herein.

FIG. 5 illustrates an overlapped coverage map 500 of the coverage map 300 of FIG. 3 and the coverage map 400 of FIG. 4, showing a first coverage region 502, a second coverage region 504, and a third coverage region 506 according to an embodiment herein. The first coverage region 502 corresponds to conditions in which both the single receiver 102 (of FIG. 1) as well as the diversity receiver 100 (of FIG. 1) satisfies a performance criteria. The second coverage region 504 corresponds to conditions in which the diversity receiver 102 satisfies the performance criteria and the single receiver 102 does not satisfy the performance criteria. The third coverage region 506 corresponds to conditions in which neither the single receiver 102 nor the diversity receiver 100 satisfy the performance criteria. In the first coverage region 502 of the mobile terminal 200, the switchable DVB-H receiver 202 operates in the single receiver mode to save power without any performance degradation since both the single receiver and the diversity receiver satisfy the performance criteria.

In the second coverage region 504, the switchable DVB-H receiver 202 switches to operating in the diversity receiver mode to achieve the best performance. In the third coverage region 506, the switchable DVB-H receiver 202 operates again in the single receiver mode, since both the single receiver 102 and the diversity receiver 100 do not satisfy the performance criteria. Further, if the channel condition in one of the channels in the diversity receiver 100 is bad, it may result in degraded performance after MRC as compared to the performance of the single receiver 102.

In one embodiment, based on the channel condition, the switchable DVB-H receiver 202 may operate in the single receiver mode to optimize performance as well as minimize power consumptions. The performance criteria may be based on Physical layer (PHY) metrics such as a combination of one or more of a Signal-to-Noise Ratio (SNR), a Bit Error Rate (BER), and a Packet Error Rate (PER). In one embodiment, the performance criteria includes a BER being less than a threshold value ($1 \times 10^{-4}$) and a PER being not equal to zero. A PER of $1 \times 10^{-4}$ may correspond fairly well to a Subjective Failure Point (SEP) being on average, one visible error in the video during an overvation period of 20 seconds. A SEP is a failure point identifying method applicable to various defects and capable of promptly identifying a defect point. In FIGS. 3 and 4, the threshold value is illustrated as $1 \times 10^{-4}$.

Figure 6:
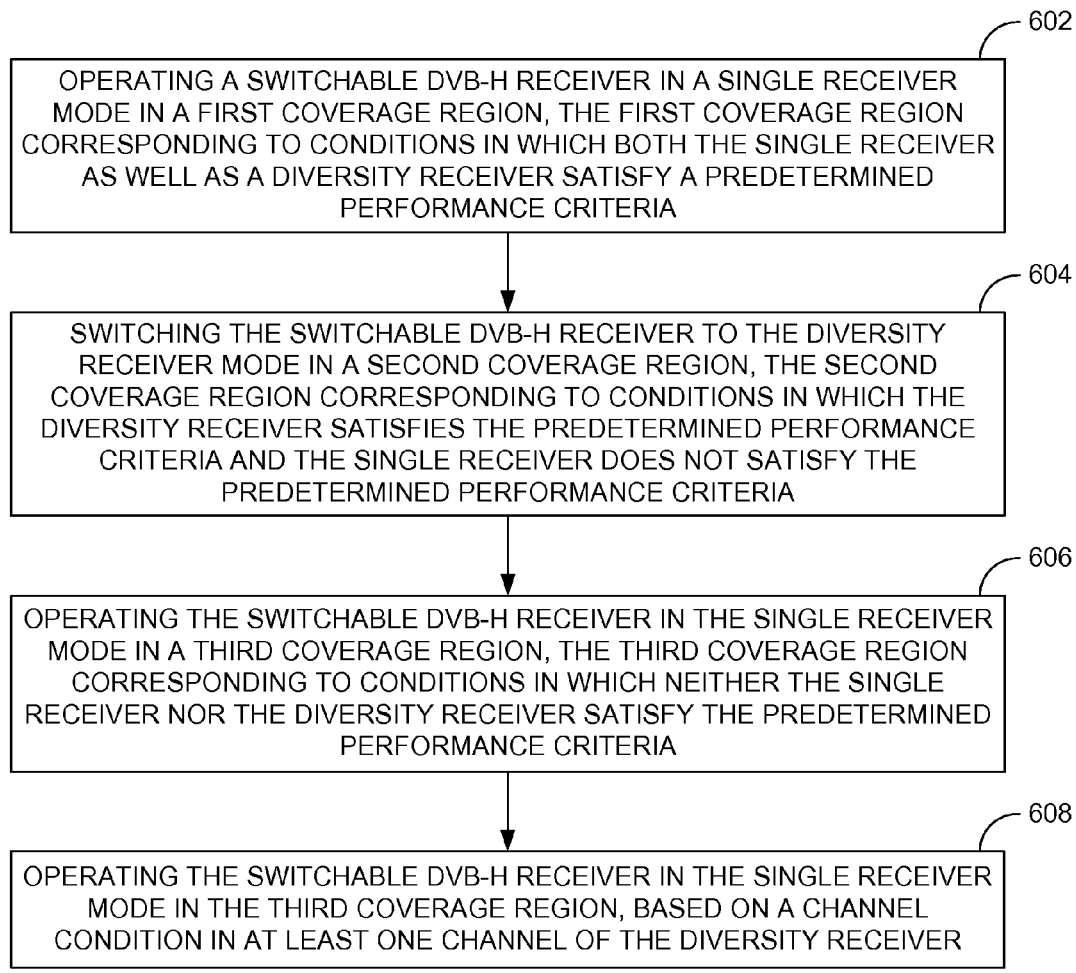
FIG. 6 is a process flow diagram illustrating a method for providing low power operations in a switchable receiver operable as a single receiver and as a diversity receiver according to an embodiment herein.

FIG. 6, with reference to FIGS. 1 through 5, is a process flow that illustrates a method for providing low power operations in a switchable receiver 202 operable as a single receiver 102 and as a diversity receiver 100 according to an embodiment herein, wherein the method comprises: operating (602) a switchable DVB-H receiver 202 in a single receiver mode in a first coverage region (e.g., as shown in FIG. 3), the first coverage region corresponding to conditions in which both the single receiver 102-104 as well as a diversity receiver 100 satisfy a predetermined performance criteria; switching (604) the switchable DVB-H receiver 202 to the diversity receiver mode in a second coverage region (e.g., as shown in FIG. 4), the second coverage region corresponding to conditions in which the diversity receiver 100 satisfies the predetermined performance criteria and the single receiver 102-104 does not satisfy the predetermined performance criteria, operating (606) the switchable DVB-H receiver 202 in the single receiver mode in a third coverage region (e.g., as shown in FIG. 5), the third coverage region corresponding to conditions in which neither the single receiver 102-104 nor the diversity receiver 100 satisfy the predetermined performance criteria, and operating (608) the switchable DVB-H receiver 202 in the single receiver mode in the third coverage region (e.g., as shown in FIG. 5), based on a channel condition in at least one channel of the diversity receiver 100.

In step 602, a switchable DVB-H receiver 202 is operated in a single receiver mode in a first coverage region (e.g., as shown in FIG. 3), the first coverage region corresponding to conditions in which both the single receiver 102-104 as well as a diversity receiver 100 satisfy a predetermined performance criteria. In step 604, the switchable DVB-H receiver 202 is switched to the diversity receiver mode in a second coverage region (e.g., as shown in FIG. 4), the second coverage region corresponding to conditions in which the diversity receiver 100 satisfies the predetermined performance criteria and the single receiver 102-104 does not satisfy the predetermined performance criteria. In step 606, the switchable DVB-H receiver 202 may be operated in the single receiver mode in a third coverage region (e.g., as shown in FIG. 5), the third coverage region corresponding to conditions in which neither the single receiver 102-104 nor the diversity receiver 100 satisfy the predetermined performance criteria. In step 608, the switchable DVB-H receiver 202 may be operated in the single receiver mode in the third coverage region (e.g., as shown in FIG. 5), based on a channel condition in at least one channel of the diversity receiver 100.

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein include both hardware and software elements. Preferably, the software embodiments include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
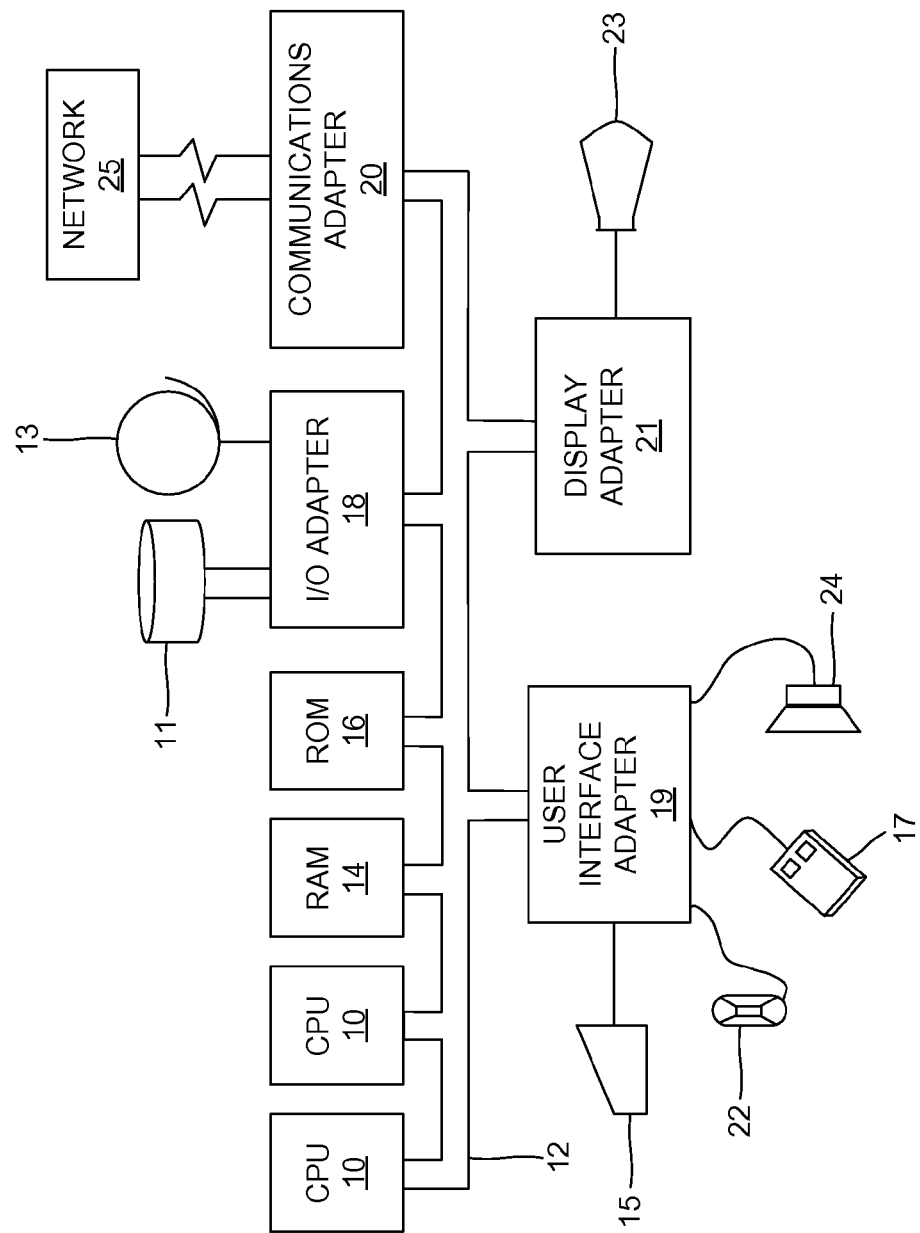
FIG. 7 is a schematic diagram illustrating a computer system according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

For example, the various methods, processes, operations, techniques, algorithms, etc. described herein including the mechanism of switching between the single receiver mode and the diversity receiver mode may be enabled and operated using hardware circuitry (e.g., CMOS based logic circuitry, ASIC, FPGA), hardware/software partitioning, firmware, software and/or any combination of hardware, firmware, and/or software embodied in a machine readable medium and/or a machine accessible medium compatible with a data processing system (e.g., a computer system, a processor in a mobile terminal), and may be performed in any order. Accordingly, the specification and drawings are to be regarded in an illustrative rather than a restrictive sense.

What is claimed is:

1. A method of providing low power operations in a switchable Digital Video Broadcasting—Handheld (DVB-H) receiver operable as a single receiver and as a diversity receiver, said method comprising:
    operating said switchable DVB-H receiver in a single receiver mode in a first coverage region, said first coverage region corresponding to a condition in which both said single receiver as well as said diversity receiver simultaneously satisfy a predetermined performance criteria; and
    switching said switchable DVB-H receiver to a diversity receiver mode in a second coverage region, said second coverage region corresponding to conditions in which said diversity receiver satisfies said predetermined performance criteria and said single receiver does not satisfy said predetermined performance criteria,
    wherein said predetermined performance criteria is based on Physical Layer (PHY) metrics, wherein said PHY metrics comprise, a Bit Error Rate (BER) and a Packet Error Rate (PER), wherein said predetermined performance criteria comprises said BER less than a threshold value, and wherein said switchable DVB-H receiver stores any of program specific information and service information comprising information about digital content available for viewing.

2. The method of claim 1, further comprising operating said switchable DVB-H receiver in said single receiver mode in a third coverage region, said third coverage region corresponding to conditions in which neither said single receiver nor said diversity receiver satisfy said predetermined performance criteria.

3. The method of claim 2, wherein said switchable DVB-H receiver is operated in said single receiver mode in said third coverage region, based on a channel condition in at least one channel of said diversity receiver.

4. The method of claim 3, wherein channels of said diversity receiver are combined using Maximal Ratio Combining (MRC).

5. A switchable Digital Video Broadcasting—Handheld (DVB-H) receiver operable as a single receiver with an effective operating area defined by a first coverage map and as a diversity receiver within an effective operating area defined by a second coverage map, said DVB-H receiver comprising:
    a processor operating said DVB-H receiver in a single receiver mode in a first coverage region, said first coverage region corresponding to a condition in which both said single receiver as well as said diversity receiver simultaneously satisfy a predetermined performance criteria through an overlapping region of said first coverage map and said second coverage map;
    a switching mechanism switching operations of said processor from said single receiver mode to a diversity receiver mode in a second coverage region, said second coverage region corresponding to a condition in which said diversity receiver satisfies said predetermined performance criteria and said single receiver does not satisfy said predetermined performance criteria through a region of said second coverage map that is outside, and thereby does not overlapping with, said first coverage map; and
    a memory component that stores any of program specific information and service information comprising information about digital content available for viewing.

6. The switchable DVB-H receiver of claim 5, wherein said processor operates in said single receiver mode in a third coverage region, said third coverage region corresponding to conditions in which neither said single receiver nor said diversity receiver satisfy said predetermined performance criteria through a region that is outside of both said first coverage map and said second coverage map.

7. The switchable DVB-H receiver of claim 5, wherein said predetermined performance criteria is based on Physical Layer (PHY) metrics.

8. The switchable DVB-H receiver of claim 7, wherein said PHY metrics comprise a Signal-to-Noise Ratio (SNR), a Bit Error Rate (BER), and a Packet Error Rate (PER).

9. The switchable DVB-H receiver of claim 8, wherein said predetermined performance criteria comprises said BER less than a threshold value.

10. The switchable DVB-H receiver of claim 6, wherein said switchable DVB-H receiver is operated in said single receiver mode in said third coverage region, based on a channel condition in at least one channel of said diversity receiver.

11. The switchable DVB-H receiver of claim 10, wherein channels of said diversity receiver are combined using Maximal Ratio Combining (MRC).

12. A mobile terminal comprising:
    a digital video broadcasting—handheld (DVB-H) receiver for receiving a digital video broadcast signal operable as a single receiver and as a diversity receiver;
    a memory component for storing the received digital video broadcast signal, wherein said memory component stores any of program specific information and service information comprising information about digital content available for viewing; and
    a processor that:
    operates said DVB-H receiver in a single receiver mode in a first coverage region, said first coverage region corresponding to a conditions in which both said single receiver as well as said diversity receiver simultaneously satisfy a predetermined performance criteria;
    switches said DVB-H receiver to a diversity receiver mode in a second coverage region, said second coverage region corresponding to conditions in which said diversity receiver satisfies said predetermined performance criteria and said single receiver does not satisfy said performance criteria; and
    operates said DVB-H receiver in said single receiver mode in a third coverage region, said third coverage region corresponding to conditions in which neither said single receiver nor said diversity receiver satisfy said predetermined performance criteria,
    wherein said predetermined performance criteria is based on Physical Layer (PHY) metrics that includes a Bit Error Rate (BER) and a Packet Error Rate (PER), and
    wherein said predetermined performance criteria comprises said BER less than a threshold value, wherein said threshold value is $1 \times 10^{-4}$ and a PER not equal to zero.

13. The mobile terminal of claim 12, wherein said switchable DVB-H receiver is operated in said single receiver mode in said third coverage region, based on a channel condition in at least one channel of said diversity receiver.

14. The mobile terminal of claim 13, wherein channels of said diversity receiver are combined using Maximal Ratio Combining (MRC).

15. The mobile terminal of claim 12, wherein said PHY metrics further includes a Signal-to-Noise Ratio (SNR).

* * * * *